(12) United States Patent
Kim et al.

(10) Patent No.: US 10,073,315 B2
(45) Date of Patent: Sep. 11, 2018

(54) DISPLAY DEVICE AND METHOD OF DRIVING THE SAME

(71) Applicant: ELECTRONICS AND TELECOMMUNICATIONS RESEARCH INSTITUTE, Daejeon (KR)

(72) Inventors: Gi Heon Kim, Daejeon (KR); Yong Hae Kim, Daejeon (KR); Chi-Sun Hwang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/007,093

(22) Filed: Jan. 26, 2016

(65) Prior Publication Data

US 2017/0139241 A1    May 18, 2017

(30) Foreign Application Priority Data

Nov. 17, 2015   (KR) .................. 10-2015-0161196

(51) Int. Cl.
*G02F 1/137* (2006.01)
*G02F 1/1334* (2006.01)
*G02F 1/1347* (2006.01)

(52) U.S. Cl.
CPC ............ *G02F 1/137* (2013.01); *G02F 1/1334* (2013.01); *G02F 1/13473* (2013.01); *G02F 1/13475* (2013.01); *G02F 1/13725* (2013.01); *G02F 2202/043* (2013.01)

(58) Field of Classification Search
CPC .............................. G02F 1/137; C09K 19/52
See application file for complete search history.

(56) References Cited

U.S. PATENT DOCUMENTS

| 5,303,073 A * | 4/1994 | Shirota ............... C09K 19/544 349/74 |
| 2001/0005244 A1* | 6/2001 | Broer ................... G02F 1/1334 349/88 |
| 2004/0248048 A1* | 12/2004 | Lee ......................... H01J 9/242 430/321 |
| 2006/0278849 A1* | 12/2006 | Suzuki .................. C09K 19/02 252/299.61 |
| 2010/0309413 A1 | 12/2010 | Jang et al. |
| 2011/0067807 A1 | 3/2011 | Hwang et al. |

(Continued)

FOREIGN PATENT DOCUMENTS

| JP | 10111633 A * | 4/1998 |
| KR | 10-2010-0132309 A | 12/2010 |

(Continued)

OTHER PUBLICATIONS

English Translation of JP10111633.*

(Continued)

*Primary Examiner* — Cynthia H Kelly
*Assistant Examiner* — Anna Malloy

(57) ABSTRACT

A display device includes a polymer layer including dichroic dyes and a liquid crystal, which is not mixed or reacted with the polymer layer, dispersed in the polymer layer. The polymer and the liquid crystal have different refractive indices from each other.

13 Claims, 9 Drawing Sheets

(56) References Cited

U.S. PATENT DOCUMENTS

| | | |
|---|---|---|
| 2012/0038852 A1 | 2/2012 | Jang et al. |
| 2014/0002777 A1 | 1/2014 | Kim et al. |
| 2014/0168595 A1 | 6/2014 | Kim et al. |

FOREIGN PATENT DOCUMENTS

| | | |
|---|---|---|
| KR | 10-2011-0032639 A | 3/2011 |
| KR | 10-2012-0015190 A | 2/2012 |

OTHER PUBLICATIONS

Yang et al., "Electro-optical characteristics of dye-doped polymer dispersed liquid crystals", Apr. 28, 2011, Journal of Industrial and Engineering Chemistry, vol. 17, 543-548.*

H. Seki et al., "Colorimetric Property of Guest-Host Liquid Crystal Displays", ASID'99, 1999, pp. 347-350.

Wen-Yu Teng et al., "Nanoparticles-doped guest-host liquid crystal displays", Optics Letters, Aug. 1, 2008, pp. 1663-1665, vol. 33, No. 15, Optical Society of America.

* cited by examiner

DISPLAY DEVICE AND METHOD OF DRIVING THE SAME

CROSS-REFERENCE TO RELATED APPLICATIONS

This U.S. non-provisional patent application claims priority under 35 U.S.C. § 119 of Korean Patent Application No. 10-2015-0161196, filed on Nov. 17, 2015, the entire contents of which are hereby incorporated by reference.

BACKGROUND OF THE INVENTION

The present disclosure herein relates to display devices and methods of driving the same, and more particularly, to display devices including a liquid crystal and methods of driving the same.

The importance of the display industry is increasing as modern society has developed into a highly information-oriented society. Recently, flat panel displays (FPDs), such as liquid crystal displays (LCDs), plasma display panels (PDPs), and organic light-emitting displays (OLEDs), are being used as the screen is wider and slimmer. In the LCD, white light emitted from a backlight is modulated while passing through a polarizing plate and a liquid crystal layer, and the modulated light generates a color while passing through a color filter.

Since the liquid crystal displays are advantageous in that their power consumption is low because low voltage operation is possible, the liquid crystal displays are being widely used in mobile portable devices, notebooks, computer monitors, and TVs.

However, the liquid crystal displays have a limitation in that optical loss is large because only a portion of light emitted from a backlight unit is used due to the use of the polarizing plate and the color filter, and a large part of the power consumption is used for driving the backlight unit.

SUMMARY OF THE INVENTION

The present disclosure provides a display device without a polarizing plate, a color filter, and a backlight unit.

The present disclosure also provides a method of driving the display device.

The object of the present disclosure is not limited to the aforesaid, but other objects not described herein will be clearly understood by those skilled in the art from descriptions below.

An embodiment of the inventive concept provides a display device including first and second electrodes configured to face each other and spaced apart from each other; a polymer layer configured to fill between the first and second electrodes and include dichroic dyes; and a liquid crystal immiscible with materials in the polymer layer.

In an embodiment of the inventive concept, a method of driving a display device includes incidenting light on a display device which includes a liquid crystal dispersed in a polymer layer including dichroic dyes; generating a color by refraction of the incident light caused by a difference between a refractive index of the polymer layer and a refractive index of the liquid crystal and scattering the incident light by the dichroic dyes in the polymer layer when there is no potential difference between the polymer layer and the liquid crystal; and transmitting the incident light to display black by allowing the liquid crystal to have the same refractive index as the refractive index of the polymer layer by aligning liquid crystal molecules of the liquid crystal in one direction when a potential difference is generated between the polymer layer and the liquid crystal.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION OF PREFERRED EMBODIMENTS

Figure 1:
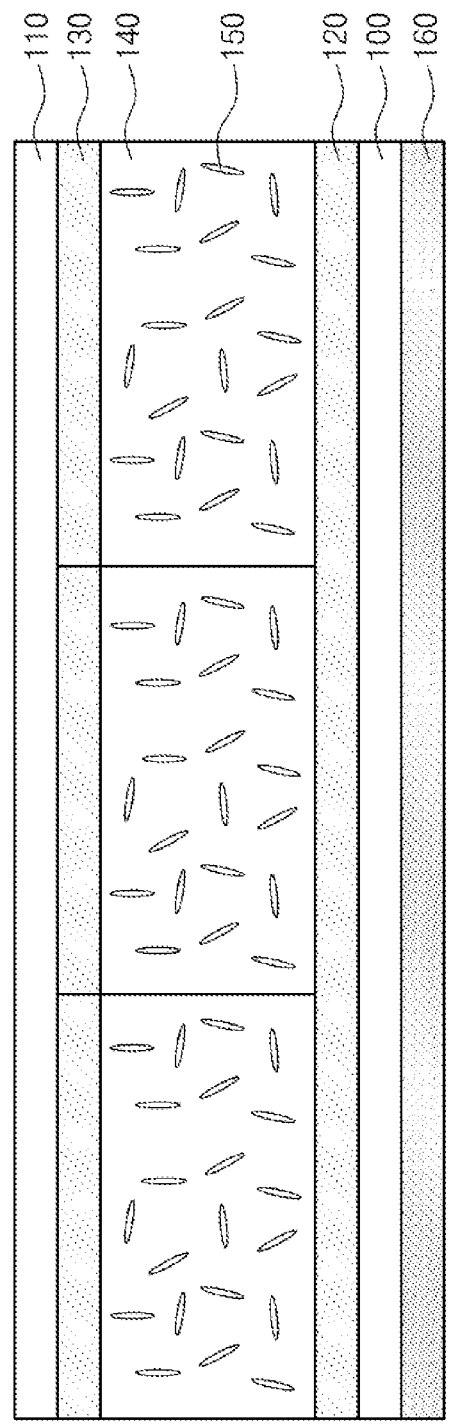
FIGS. 1 through 3 are cross-sectional views illustrating a display device according to embodiments of the inventive concept.

The foregoing and other objects, features and advantages of the present disclosure will become more readily apparent from the following detailed description of preferred embodiments of the present disclosure that proceeds with reference to the appending drawings. The present disclosure may, however, be embodied in different forms and should not be construed as limited to the embodiments set forth herein. Rather, these embodiments are provided so that this disclosure will be thorough and complete, and will fully convey the scope of the inventive concept to those skilled in the art.

In this specification, it will be understood that when an element is referred to as being "on" another element, it can be directly on the other element or intervening elements may also be present therebetween. Also, in the figures, the thicknesses of elements are exaggerated for clarity of illustration.

The embodiments in the detailed description will be described with sectional and/or plan views as ideal exemplary views of the inventive concept. In the figures, the thicknesses of layers and regions are exaggerated for clarity of illustration. Accordingly, shapes of the exemplary views may be modified according to manufacturing techniques and/or allowable errors. Therefore, the embodiments of the inventive concept are not limited to the specific shape illustrated in the exemplary views, but may include other shapes that may be created according to manufacturing processes. For example, an etched region illustrated as a rectangle may have rounded or curved features. Areas exemplified in the drawings have general properties, and are used to illustrate a specific shape of a device region. Thus, this should not be construed as limited to the scope of the inventive concept. It will be understood that, although the terms first, second, etc. may be used herein to describe various elements, these elements should not be limited by these terms. These terms are only used to distinguish one element from another element. Embodiments described and exemplified herein include complementary embodiments thereof.

In the following description, the technical terms are used only for explaining a specific exemplary embodiment while not limiting the inventive concept. The terms of a singular form may include plural forms unless referred to the contrary. It will be understood that the terms "comprises" and/or "comprising", when used in this specification, specify the presence of stated elements, but do not preclude the presence or addition of one or more other elements.

Hereinafter, embodiments of the inventive concept will be described in detail with reference to the accompanying drawings.

Figure 2:
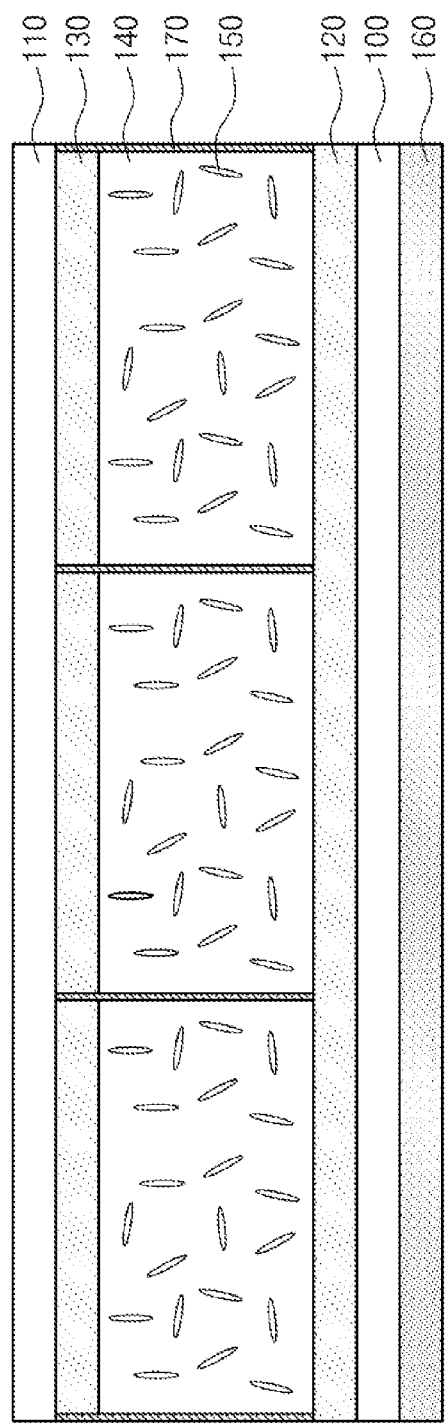
Figure 3:
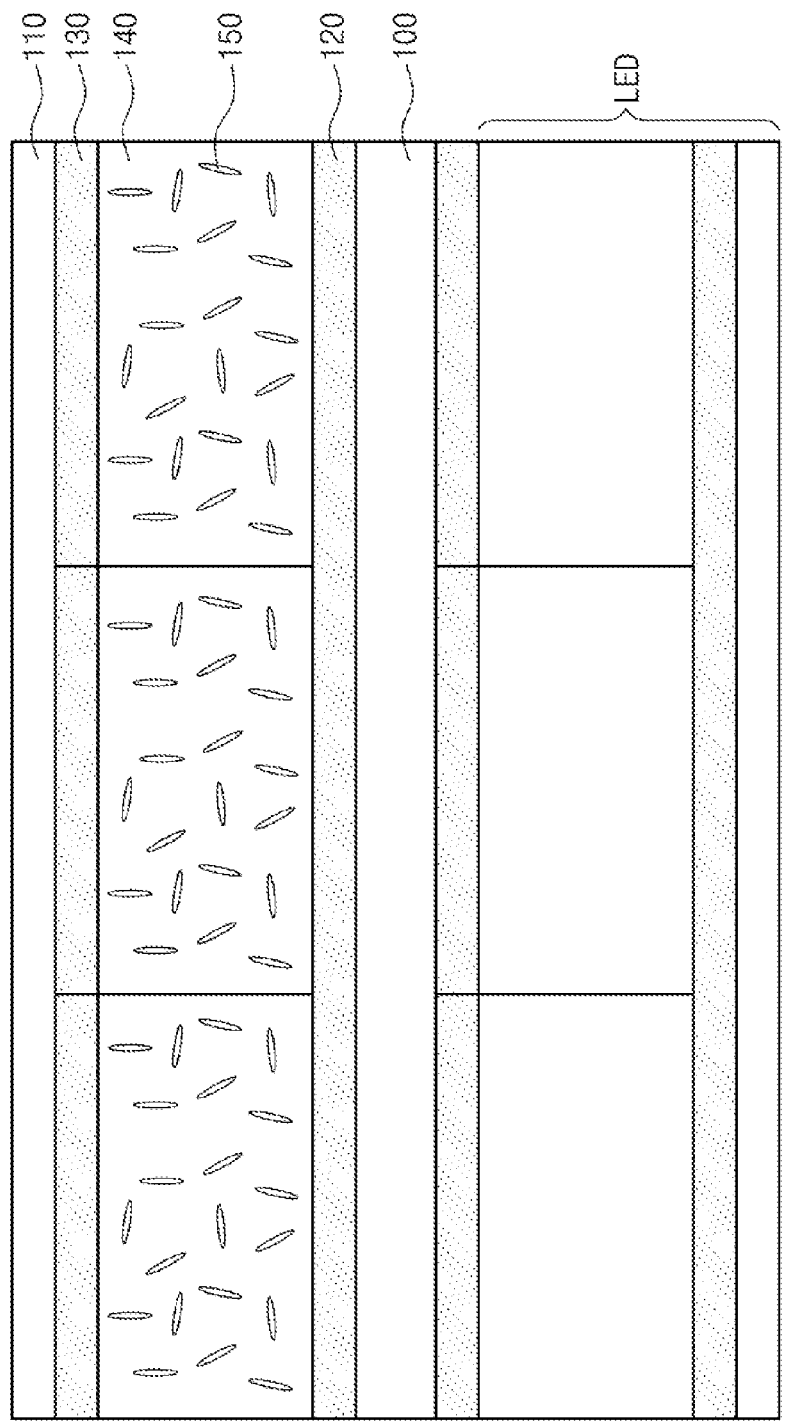

FIGS. 1 through 3 are cross-sectional views illustrating a display device according to embodiments of the inventive concept.

Referring to FIGS. 1 through 3, the display device may include a first substrate 100 and a second substrate 110 facing each other, a first electrode 120 and a second electrode 130 facing each other, a polymer layer 140 configured to fill between the first and second electrodes 120 and 130, and a liquid crystal 150 disposed in the polymer layer 140.

One surface of the first substrate 100 faces one surface of the second substrate 110 and both surfaces may be spaced apart from each other. The first substrate 100 and the second substrate 110 are transparent and, for example, may include glass or plastic.

A plurality of sub-pixels may be included on the first substrate 100. For example, three sub-pixels constitute a single pixel, and the three sub-pixels may show different colors from one another. In FIGS. 1 through 3, that three sub-pixels are included on the first substrate 100 will be exemplarily described.

The first electrode 120 may be disposed on one surface of the first substrate 100, and the second electrode 130 may be disposed on one surface of the second substrate 110. One surface of the first electrode 120 and one surface of the second electrode 130 may face each other and may be spaced apart from each other.

The first electrode 120 and the second electrode 130 may include at least one selected from the group consisting of indium tin oxide (ITO), indium zinc oxide (IZO), silver nanowire, carbon nanotube, graphene, poly(3,4-ethylenedioxythiophene)-polystyrenesulfonic acid (PEDOT:PSS), polyaniline, and polythiophene, or may include a mixture thereof.

According to an embodiment of the inventive concept, in a case in which the display device is an active matrix drive type, the first electrode 120 may be an integrated common electrode, and the second electrode 130 may be connected to a thin film transistor (TFT) and may be patterned in a shape corresponding to the sub-pixels.

According to another embodiment of the inventive concept, in a case in which the display device is a passive matrix drive type, the first electrode 120 may be disposed parallel to each other in the form of a stripe, and the second electrode 130 may be disposed parallel to each other in the form of a stripe crossing the first electrode 120.

The polymer layer 140 may include a reactive monomer or reactive oligomer, a radical initiator, and a dichroic dye.

The reactive monomer or reactive oligomer may include at least one selected from the group consisting of an acryl-based material, an aromatic-based material, an acrylonitrile-based material, and a chloride-based material, or a mixture thereof. For example, the acryl-based material may include triethylopropane triacrylate (TMPTA), tri(propylene glycol) diacrylate (TPGDA), penthaerithritol triacrylate (PETA), trimethylolpropane ethoxylate triacrylate (TMPEOTA), methyl methacrylate (MMA), methacrylate (MA), tri(propylene glycol) glycerolate diacrylate (TPGDA), vinylacrylate (VA), ethylene glycol dimethacrylate (EGDA), epoxy acrylate monomer or oligomer, and 1,6-hexandiol diacrylate (HAD). The aromatic-based material may include at least one of styrene (ST) and divinyl benzene (DVB). The acrylonitrile-based material may include acrylonitrile (AN). The chloride-based material may include at least one of vinylidene chloride (VDC) and vinylbenzyl chloride (VBC). In addition, the reactive monomer may include vinyl stearate (VS) and vinyl propionate (VP). However, in the embodiment of the inventive concept, the reactive monomer or reactive oligomer is not limited to the above examples.

The radical initiator may include at least one selected from the group consisting of a photoinitiator, a thermal initiator, and an initiator using a redox reaction, or a mixture thereof. For example, the photoinitiator may include 1-hydroxy-cyclohexyl-phenyl-ketone (IRGACURE 907), 2-methyl-1[4-(methylthio)phenyl]-2-morpholinopropane-1-one (IRGACURE 184C), 1-hydroxy-2-methyl-1-phenyl-propane-1-one (DAROCUR 1173), an initiator (IRGACURE 500) in which about 50 wt % of IRGACURE 184C and about 50 wt % of benzophenone are mixed, an initiator (IRGACURE 1000) in which about 20 wt % of IRGACURE 184 and about 80 wt % of IRGACURE 1173 are mixed, 2-hydroxy-1-[4-(2-hydroxyethoxy)phenyl]-2-methyl-1propanone (IRGACURE 2959), methylbenzoylformate (DAROCUR MBF), alpha,alpha-dimethoxy-alpha-phenylacetophenone (IRGACURE 651), 2-benzyl-2-(dimethylamino)-1-[4-(morpholinyl) phenyl]-1-butanone (IRGACURE 369), an initiator (IRGACURE 1300) in which about 30 wt % of IRGACURE 369 and about 70 wt % of IRGACURE 651 are mixed, diphenyl (2,4,6-trimethylbenzoyl)-phosphine oxide (DAROCUR TPO), an initiator (DAROCUR 4265) in which about 50 wt % of DAROCUR TPO and about 50 wt % of DAROCUR 1173 are mixed, phosphine oxide, phenyl bis (2,4,6-trimethyl benzoyl) (IRGACURE 819), an initiator (IRGACURE 2005) in which about 5 wt % of IRGACURE 819 and about 95 wt % of DAROCUR 1173 are mixed, an initiator (IRGACURE 2010) in which about 10 wt % of IRGACURE 819 and about 90 wt % of DAROCUR 1173 are mixed, an initiator (IRGACURE 2020) in which about 20 wt % of IRGACURE 819 and about 80 wt % of DAROCUR 1173 are mixed, bis(.eta.5-2,4-cyclopentadien-1-yl) bis[2,6-difluoro-3-(1h-pyrrol-1-yl)phenyl]titanium (IRGACURE 784), a mixed initiator containing benzophenone (HSP 188), and 1-hydroxy-cyclohexylphenyl-ketone (CPA). The thermal initiator may include benzoyl peroxide (BP), acetyl peroxide (AP), diauryl peroxide (DP), di-tert-butyl peroxide (t-BTP), cumyl hydroperoxide (CHP), hydrogen peroxide (HP), potassium peroxide (PP), 2,2'-azobisisobutyronitrile (AIBN), an azo compound initiator, and silver alkyls. The initiator using a redox reaction may include potassium persulfate ($K_2S_2O_8$) and a redox initiator. However, in the embodiment of the inventive concept, the radical initiator is not limited to the above examples.

The dichroic dye may have an aromatic ring or condensed ring which is dissolved in the reactive monomer or reactive oligomer at low temperature. The aromatic ring or condensed ring may improve thermal stability. Also, the dichroic dye is immiscible with the liquid crystal 150 and may include a material having dispersibility in a polymer.

In the present embodiment, the dichroic dye may include a blue dye, a red dye, and a green dye.

The blue dye may have structures of the following Formulae 1 and 2.

[Formula 1]

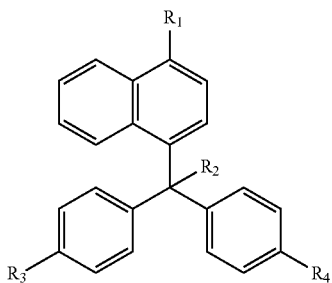

In this case, $R_1$, $R_2$, $R_3$, and $R_4$ may be the same or different. $R_1$ to $R_4$ may include at least one selected from the group consisting of —$NC_4H_{10}$, —$NC_2H_6$, —$NHCH_3$, —$NH_2$, —N(alkyl chain having 3 or more carbon atoms), —H, —OH, —$CH_3$, —$C_2H_5$, a linear alkyl group having 3 or more carbon atoms, a branched alkyl group having 3 or more carbon atoms, a linear alkene having 3 or more carbon atoms, a branched alkene having 3 or more carbon atoms, and one or more aromatic groups. For example, $R_1$ may include one of —$NC_4H_{10}$, —$NC_2H_6$, —$NHCH_3$, —$NH_2$, or —N(alkyl chain having 3 or more carbon atoms). $R_2$ may include one of —H, —OH, —$CH_3$, —$C_2H_5$, a linear alkyl group having 3 or more carbon atoms, a branched alkyl group having 3 or more carbon atoms, a linear alkene having 3 or more carbon atoms, a branched alkene having 3 or more carbon atoms, or one or more aromatic groups.

[Formula 2]

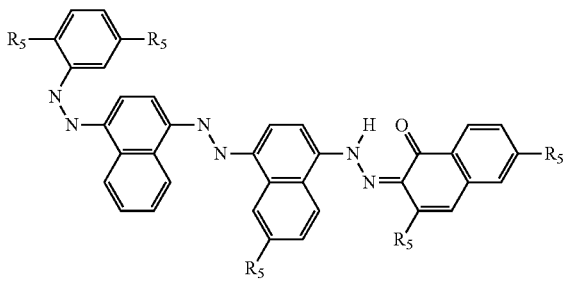

In this case, $R_5$ may include at least one selected from the group consisting of —$SO_3Na$ and —$SO_3H$. $R_6$ may include at least one selected from the group consisting of —$NH_2$, —$NHCH_3$, and —$NHC_6H_5$.

The red dye may have structures of the following Formulae 3 and 4.

[Formula 3]

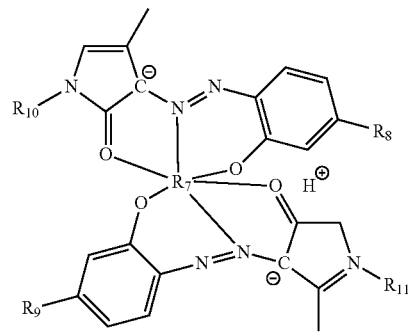

In this case, $R_7$ may include at least one selected from the group consisting of chromium (Cr), molybdenum (Mo), tungsten (W), manganese (Mn), vanadium (V), niobium (Nb), and tantalum (Ta). $R_8$, $R_9$, $R_{10}$, and $R_{11}$ may be the same or different. $R_8$, $R_9$, $R_{10}$, and $R_{11}$ may include at least one selected from the group consisting of —$NO_2$, —$NH_3$, —$NHCH_3$, —$NC_4H_{10}$, —$NC_2H_6$, —N(alkyl chain having 3 or more carbon atoms), and one or more aromatic groups.

[Formula 4]

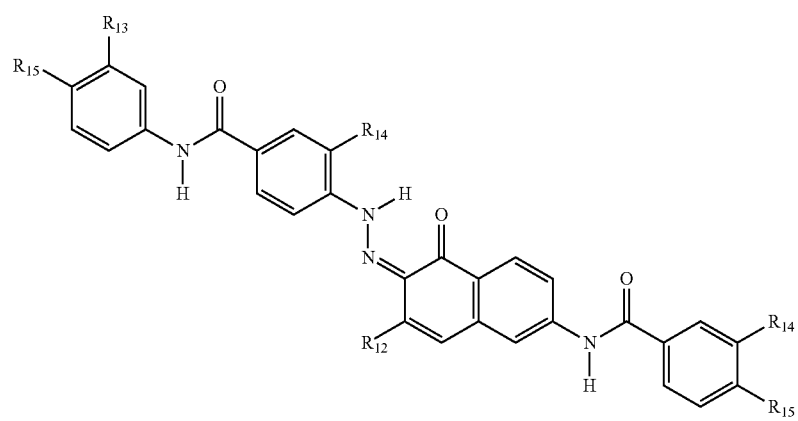

In this case, $R_{12}$ may include at least one selected from the group consisting of —$SO_3Na$ and —$SO_3H$. $R_{13}$ may include at least one selected from the group consisting of —COOH and —COONa. $R_{14}$ and $R_{15}$ may be the same or different. $R_{14}$ and $R_{15}$ may include at least one selected from the group consisting of —H, —$CH_3$, —$C_2H_5$, a linear alkyl group having 3 or more carbon atoms, a branched alkyl group having 3 or more carbon atoms, a linear alkene having 3 or more carbon atoms, a branched alkene having 3 or more carbon atoms, —$NC_4H_{10}$, —$NC_2H_6$, —$NHCH_3$, —$NH_2$, —N(alkyl chain having 3 or more carbon atoms), and one or more aromatic groups. $R_{16}$ may include at least one selected from the group consisting of —H, —OH, —$SO_3H$, and —COOH.

The green dye may include a structure of the following Formula 5.

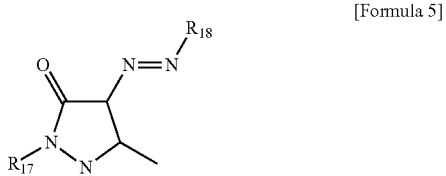

[Formula 5]

In this case, $R_{17}$ and $R_{18}$ may be the same or different. $R_{17}$ and $R_{18}$ may include at least one selected from the group consisting of the following structures.

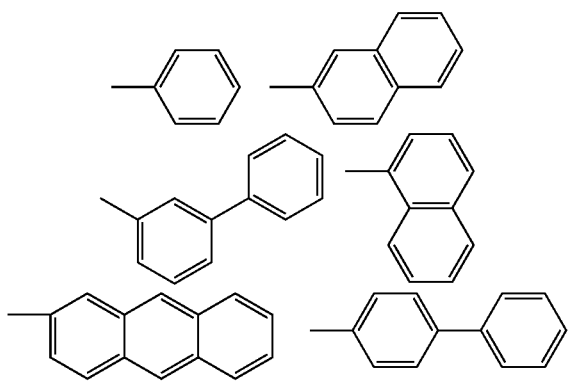

The liquid crystal 150 may include a plurality of liquid crystal molecules, wherein the liquid crystal 150 may include a typical liquid crystal used in a liquid crystal display. The liquid crystal 150 may have characteristics in which it is immiscible with the polymer layer 140. An average refractive index of the liquid crystal 150 and an average refractive index of the polymer layer 140 are different from each other so that incident light is reflected and scattered by the dichroic dye in the polymer layer 140. The scattered light is obtained by the selective scattering of the light having a specific wavelength by the dichroic dye, wherein a color may be displayed in each sub-pixel. A description thereof will be provided in detail subsequently.

A light-absorbing layer 160 may be disposed on another surface corresponding to the one surface of the first substrate 100. The light-absorbing layer 160 may absorb light transmitted from each sub-pixel. A description thereof will be provided in detail subsequently.

Referring to FIG. 2, partition walls 170 may be disposed between the sub-pixels in which the polymer layer 140 and the liquid crystal 150 are filled. Each of the dichroic dyes may be filled in each sub-pixel by the partition walls 170.

Referring to FIG. 3, a light-emitting device LED may be further included under the first substrate 100. The light-emitting device LED may include a plurality of sub-light-emitting pixels. The sub-light-emitting pixels may include a blue light-emitting pixel, a red light-emitting pixel, and a green light-emitting pixel. The blue light-emitting pixel may correspond to a portion of the polymer layer 140 in which the blue dye is included, the red light-emitting pixel may correspond to a portion of the polymer layer 140 in which the red dye is included, and the green light-emitting pixel may correspond to a portion of the polymer layer 140 in which the green dye is included. In a case in which the display device is used in a dark environment, the light-emitting device LED may be used for transferring light to the polymer layer 140 instead of insufficient external light.

Figure 4:
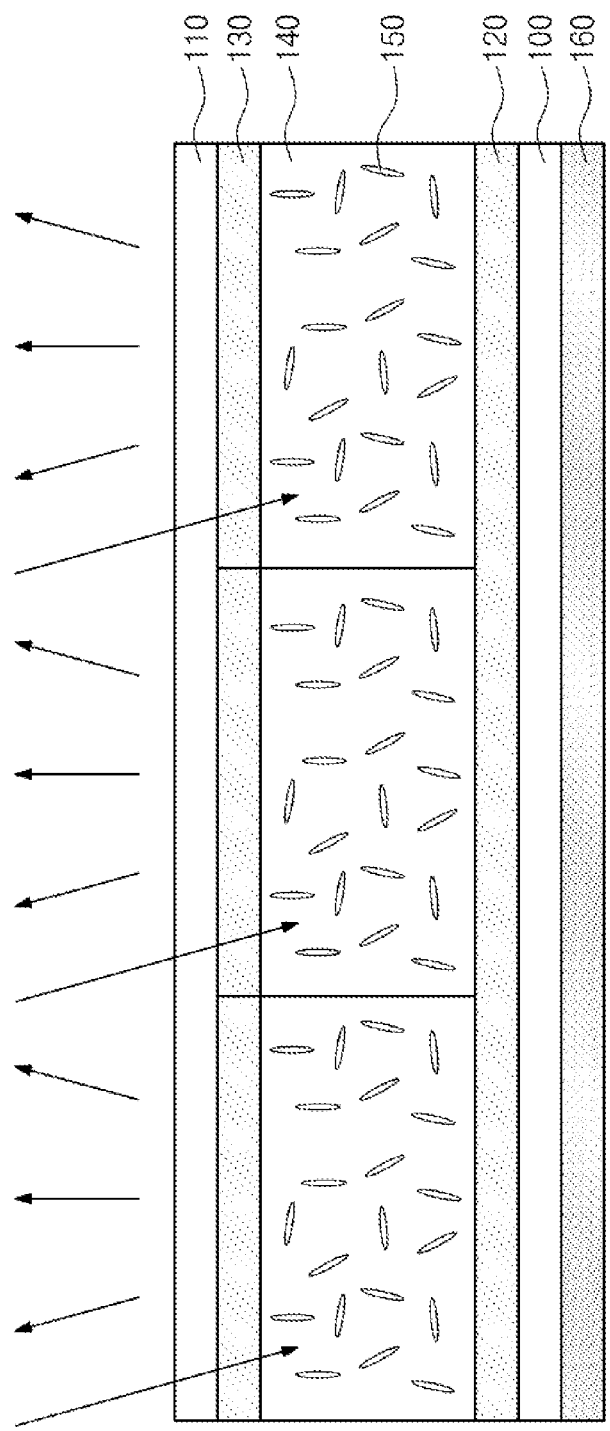
FIGS. 4 and 5 are cross-sectional views illustrating a method of driving the display device according to the embodiments of the inventive concept.
Figure 5:
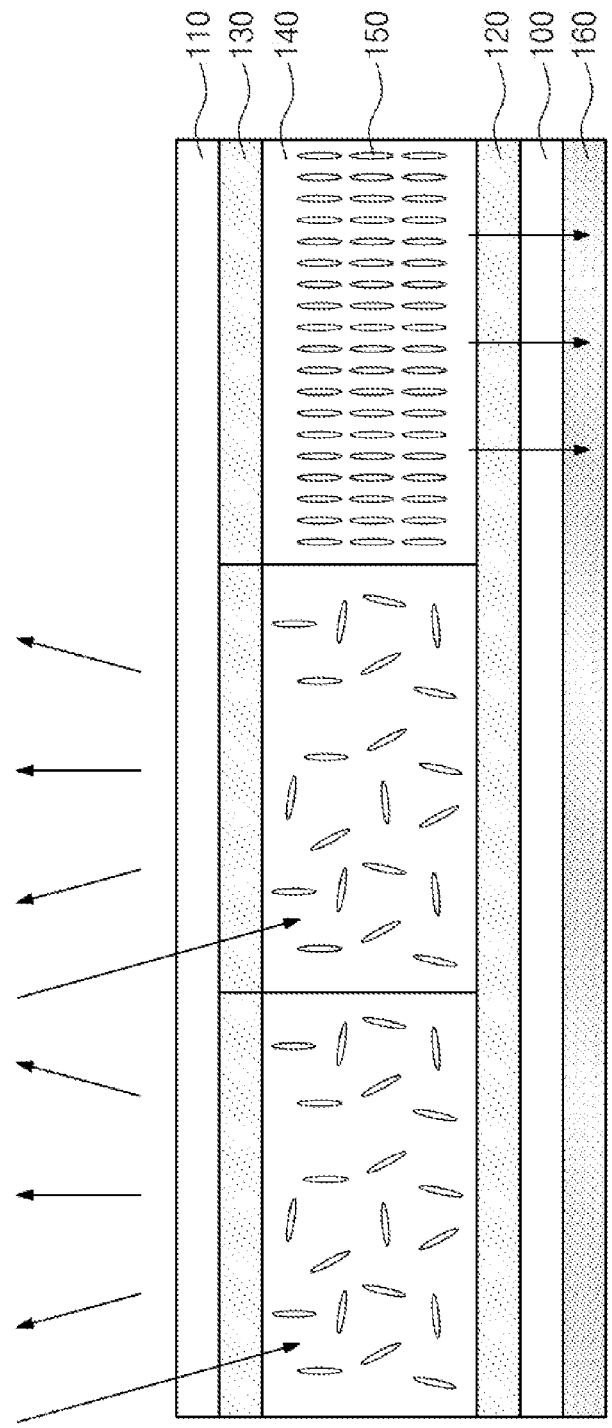

FIGS. 4 and 5 are cross-sectional views illustrating a method of driving the display device according to the embodiments of the inventive concept.

Referring to FIG. 4, in a case in which a voltage is not applied to the display device, light is incident from the outside, the incident light is refracted between the polymer layer 140 and the liquid crystal 150, and the light having a specific wavelength is scattered by the dichroic dyes in the polymer layer 140. Thus, each color (blue, red, or green) of the dichroic dyes may be realized.

Referring to FIG. 5, when a voltage is applied to a specific pixel of the display device, liquid crystal molecules in the polymer layer 140 may be aligned in one direction. The liquid crystal molecules may be aligned parallel to an electric field, and a refractive index in a minor axis direction of the liquid crystal 150 may coincide with a refractive index of the polymer layer 140. In a case in which the refractive index in the minor axis direction of the liquid crystal 150 coincides with the refractive index of the polymer layer 140, the incident light is not scattered but may be transmitted. In this case, the transmitted light is absorbed by the light-absorbing layer 160 under the first substrate 100, and the above pixel may display black.

In a case in which the display device according to the embodiments of the inventive concept is used, a backlight unit is not required, and since the light is scattered by the dichroic dyes dispersed in the polymer layer 140, a polarizing plate may not be required. Also, since the dyes of different colors are dispersed in each of the sub-pixels, a color filter may not be required.

FIGS. 6 through 13 are cross-sectional views illustrating a method of manufacturing a display device according to an embodiment of the inventive concept.

Figure 6:
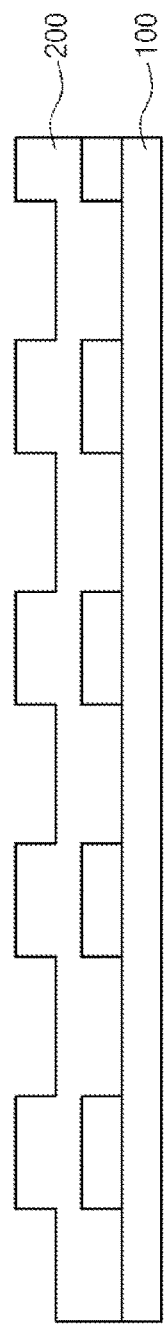
FIGS. 6 through 13 are cross-sectional views illustrating a method of manufacturing a display device according to an embodiment of the inventive concept.

Referring to FIG. 6, a first material layer 200 may be formed on a substrate 100. The first material layer 200 may include reactive monomers, a radical initiator, first dichroic dyes, and a liquid crystal. For example, the radical initiator may include a photoinitiator.

Figure 7:
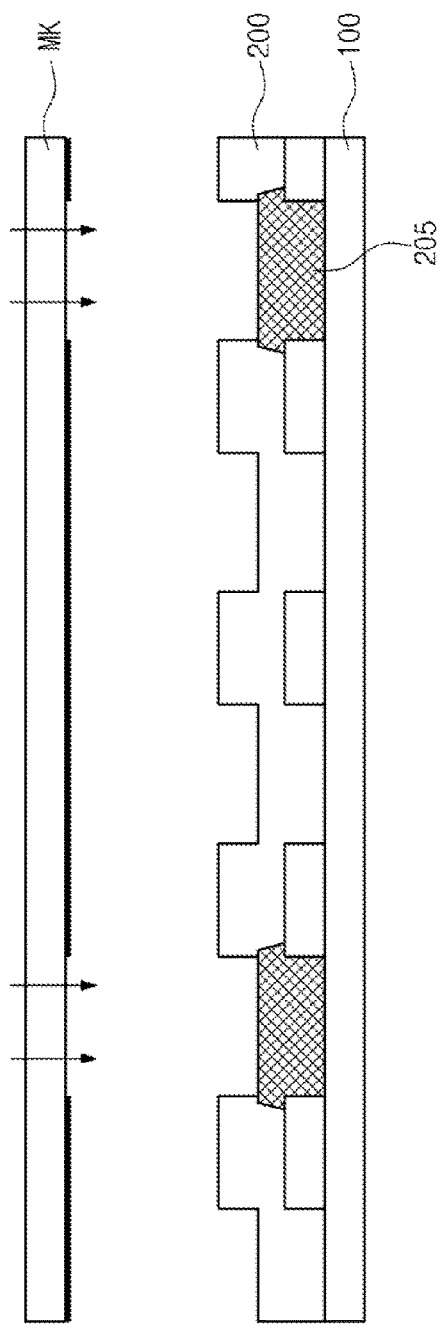

Referring to FIG. 7, a mask MK configured to open a first position of the first material layer 200 is disposed on the first material layer 200, and a first reaction pattern 205 may be formed at the first position of the first material layer 200 by the irradiation of light. Specifically, the radical initiator in the first material layer 200 may react with the light to synthesize reactive monomers and may form a polymer. The first dichroic dyes and the liquid crystal may be dispersed in the polymer during the polymer is formed and cured.

Figure 8:
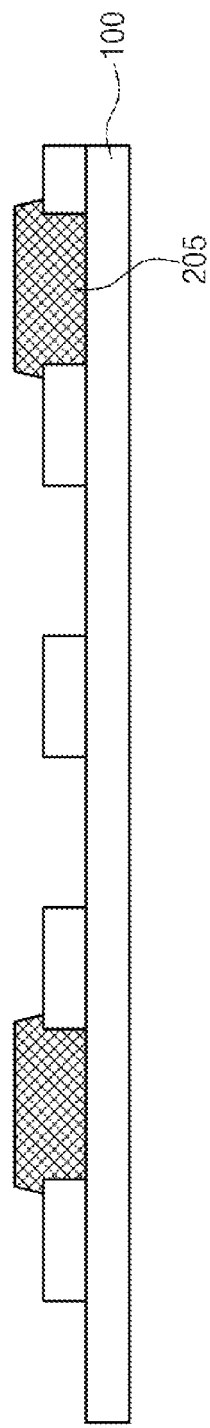

Referring to FIG. 8, after the first reaction patterns 205 are formed, the remaining first material layer 200 may be removed.

Figure 9:
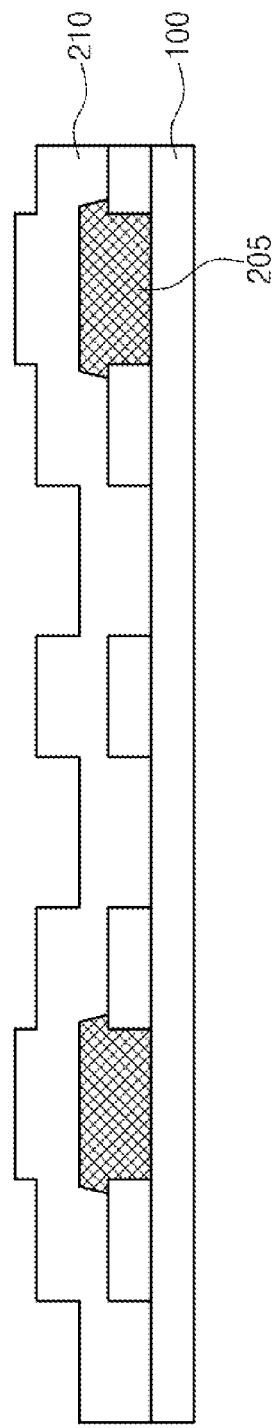

Referring to FIG. 9, a second material layer 210 may be formed on the substrate 100 on which the first reaction patterns are formed. The second material layer 210 may include reactive monomers, a radical initiator, second dichroic dyes, and a liquid crystal. The second dichroic dyes may generate a color different from the first dichroic dyes.

Figure 10:
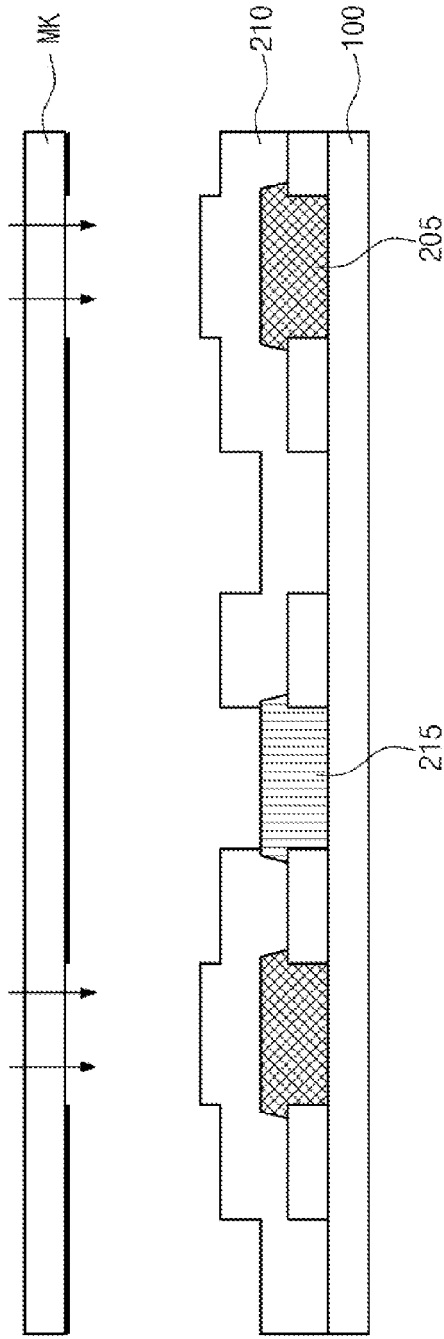

Referring to FIG. 10, a mask MK configured to open a second position of the second material layer 210 is disposed on the second material layer 210, and a second reaction pattern 215 may be formed at the second position of the second material layer 210 by the irradiation of light. The second position may not overlap the first position.

Figure 11:
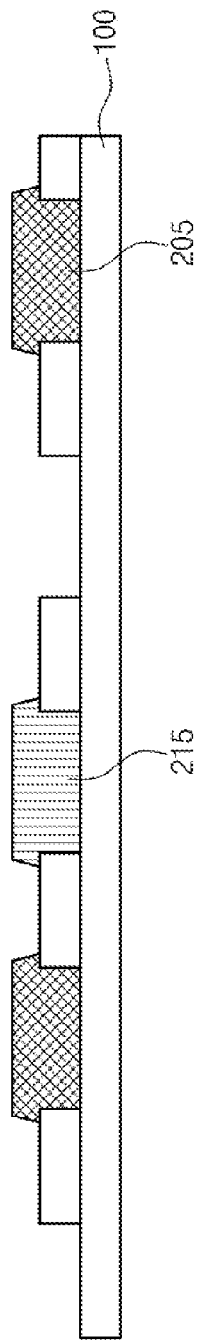

Referring to FIG. 11, after the second reaction patterns 215 are formed, the remaining second material layer 210 may be removed.

Figure 12:
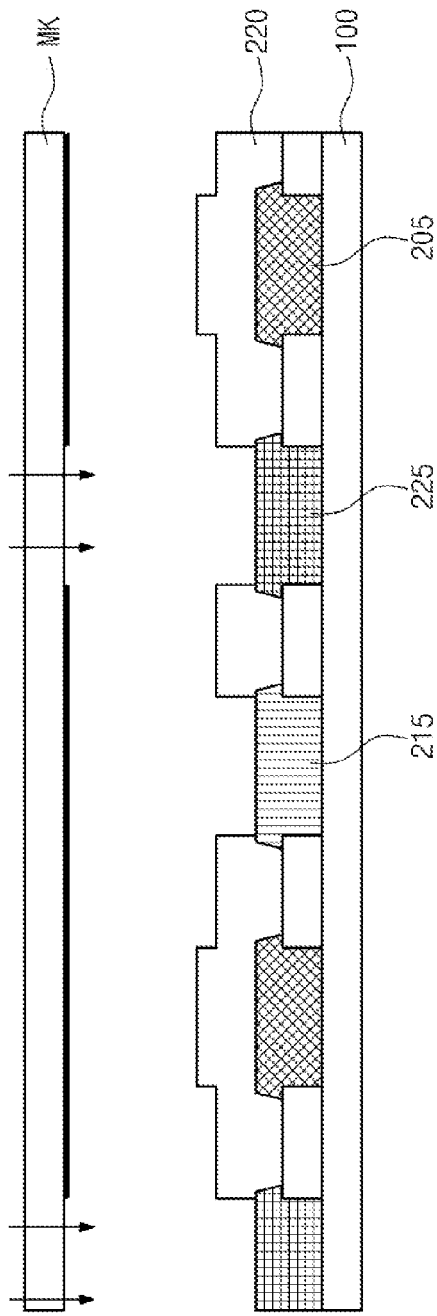

Referring to FIG. 12, a third material layer 220 may be formed on the substrate 100 on which the second reaction patterns 215 are formed. The third material layer 220 may include reactive monomers, a radical initiator, third dichroic dyes, and a liquid crystal. The third dichroic dyes may generate a color different from the first dichroic dyes and the second dichroic dyes.

Figure 13:
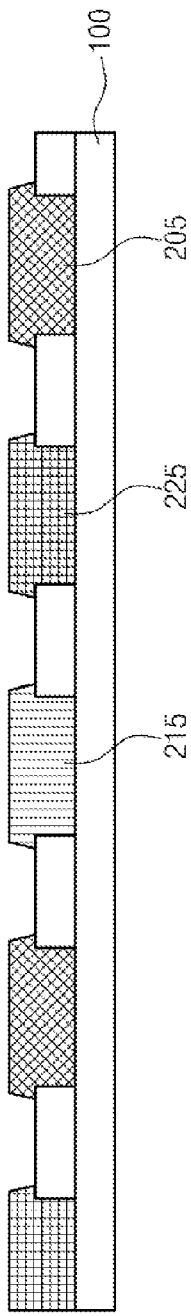

Referring to FIG. 13, a mask MK configured to open a third position of the third material layer 220 is disposed on the third material layer 220, and a third reaction pattern 225 may be formed at the third position of the third material layer 220 by the irradiation of light. The third position may not respectively overlap the first position and the second position.

The third reaction patterns 225 are formed, and the remaining third material layer 220 may then be removed.

Although a typical lithographic method using a photoreaction has been exemplarily described in the present embodiment, the embodiment of the inventive concept is not limited thereto. For example, partition walls defining sub-pixels are formed on the substrate 100, a reactant having a desired color is put in each of the sub-pixels by inkjet, offset, or slot die coating, and a display device may then be formed by curing the reactant by the irradiation of heat or light.

According to embodiments of the inventive concept, a transmissive-reflective display device capable of displaying a color image without a backlight unit, a polarizing plate, and a color filter may be provided by using a polymer layer including dichroic dyes and a liquid crystal immiscible with the polymer layer.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed. Accordingly, it is to be understood that the inventive concept has been described by way of illustration and not limitation.

What is claimed is:

1. A display device comprising:
   first and second electrodes configured to face each other and spaced apart from each other;
   a polymer layer configured to fill a space between the first and second electrodes and include dichroic dyes; and
   a liquid crystal immiscible with materials in the polymer layer,
   wherein the polymer layer comprises a reactive monomer or oligomer, and a radical initiator,
   wherein the reactive monomer or oligomer comprises trimethylolpropane ethoxylate triacrylate (TMPEOTA),
   wherein the radical initiator includes benzophenone, and
   wherein the dichroic dye comprises a blue dye comprising a structure of Formula 1:

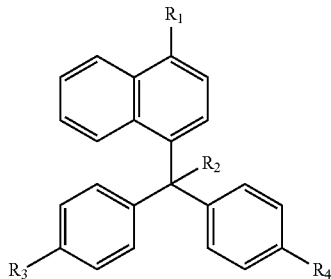

[Formula 1]

$R_1$ being —$NC_2H_6$, R2 being —OH, and each of R3 and R4 being —$NC_4H_{10}$.

2. The display device of claim 1, wherein, with respect to light incident on the display device, a refractive index of the polymer layer is different from a refractive index of the liquid crystal.

3. The display device of claim 1, wherein the reactive monomer or oligomer further comprises at least one selected from the group consisting of triethylopropane triacrylate (TMPTA), tri(propylene glycol) diacrylate (TPGDA), penthaerithritol triacrylate (PETA), methyl methacrylate (MMA), methacrylate (MA), tri(propylene glycol) glycerolate diacrylate (TPGDA), vinylacrylate (VA), ethylene glycol dimethacrylate (EGDA), epoxy acrylate monomer or oligomer, 1,6-hexandiol diacrylate (HAD), styrene (ST), divinyl benzene (DVB), acrylonitrile (AN), vinylidene chloride (VDC), vinylbenzyl chloride (VBC), vinyl stearate (VS), and vinyl propionate (VP).

4. The display device of claim 1, wherein the radical initiator further comprises at least one of a photoinitiator, a thermal initiator, and an initiator using a redox reaction.

5. The display device of claim 4, wherein the photoinitiator comprises at least one selected from the group consisting of 1-hydroxy-cyclohexyl-phenyl-ketone, 2-methyl-1 [4-(methylthio)phenyl]-2-morpholinopropane-1-one, 1-hydroxy-2-methyl-1-phenyl-propane-1-one, an initiator in which 50 wt % of 2-methyl-1[4-(methylthio)phenyl]-2-morpholinopropane-1-one and 50 wt % of the benzophenone are mixed, an initiator in which 20 wt % of 1-hydroxy-cyclohexyl-phenyl-ketone and 80 wt % of 1-hydroxy-2-methyl-1-phenyl-propane-1-one are mixed, 2-hydroxy-1-[4-(2-hydroxyethoxy)phenyl]-2-methyl-1propanone, methylbenzoylformate, alpha,alpha-dimethoxy-alpha-phenylacetophenone, 2-benzyl-2-(dimethylamino)-1[4-(morpholinyl) phenyl]-1-butanone, an initiator in which 30 wt % of -benzyl-2-(dimethylamino)-1-[4-(morpholinyl) phenyl]-1-butanone and 70 wt % of alpha,alpha-dimethoxy-alpha-phenylacetophenone are mixed, diphenyl (2,4,6-trimethylbenzoyl)-phosphine oxide, an initiator in which 50 wt % of diphenyl (2,4,6-trimethylbenzoyl)-phosphine oxide and 50 wt % of 1-hydroxy-2-methyl-1-phenyl-propane-1-one are mixed, phosphine oxide, phenyl bis(2,4,6-trimethyl benzoyl), an initiator in which 5 wt % of phosphine oxide, phenyl bis(2,4,6-trimethyl benzoyl) and 95 wt % of 1-hydroxy-2-methyl-1-phenyl-propane-1-one are mixed, an initiator in which 10 wt % of phosphine oxide, phenyl bis(2, 4,6-trimethyl benzoyl) and 90 wt % of 1-hydroxy-2-methyl-1-phenyl-propane-1-one are mixed, an initiator in which 20 wt % of phosphine oxide, phenyl bis(2,4,6-trimethyl benzoyl) and 80 wt % of 1-hydroxy-2-methyl-1-phenyl-propane-1-one are mixed, bis(.eta.5-2,4-cyclopentadien-1-yl)bis[2,6-difluoro-3-(1h-pyrrol-1-yl)phenyl]titanium, a mixed initiator containing the benzophenone, and 1-hydroxy-cyclohexylphenyl-ketone.

6. The display device of claim 4, wherein the thermal initiator comprises at least one selected from the group consisting of benzoyl peroxide (BP), acetyl peroxide (AP), diauryl peroxide (DP), di-tert-butyl peroxide (t-BTP), cumyl hydroperoxide (CHP), hydrogen peroxide (HP), potassium peroxide (PP), 2,2'-azobisisobutyronitrile (AIBN), an azo compound initiator, and silver alkyls.

7. The display device of claim 4, wherein the initiator using a redox reaction comprises potassium persulfate ($K_2S_2O_8$) and a redox initiator.

8. The display device of claim 1, wherein the dichroic dye further comprises a red dye and a green dye.

9. The display device of claim 8, wherein the red dye comprises a structure of Formula 3:

[Formula 3]

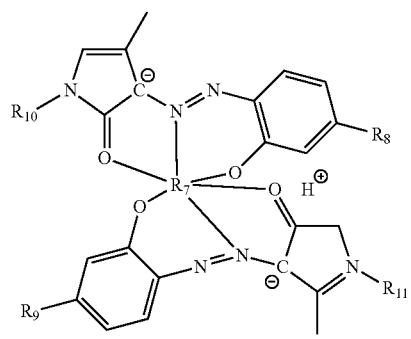

wherein $R_7$ comprises at least one selected from the group consisting of chromium (Cr), molybdenum (Mo), tungsten (W), manganese (Mn), vanadium (V), niobium (Nb), and tantalum (Ta), $R_8$, $R_9$, $R_{10}$, and $R_{11}$ are a same or different, and $R_8$, $R_9$, $R_{10}$, and $R_{11}$ comprise at least one selected from the group consisting of —$NO_2$, —$NH_3$, —$NHCH_3$, —$NC_4H_{10}$, —$NC_2H_6$, —N(alkyl chain having 3 or more carbon atoms), and one or more aromatic groups.

10. The display device of claim 8, wherein the red dye comprises a structure of Formula 4:

wherein $R_{12}$ comprises at least one selected from the group consisting of —$SO_3Na$ and —$SO_3H$, $R_{13}$ comprises at least one selected from the group consisting of —COOH and —COONa, $R_{14}$ and $R_{15}$ are a same or different, $R_{14}$ and $R_{15}$ comprise at least one selected from the group consisting of —H, —$CH_3$, —$C_2H_5$, a linear alkyl group having 3 or more carbon atoms, a branched alkyl group having 3 or more carbon atoms, a linear alkene having 3 or more carbon atoms, a branched alkene having 3 or more carbon atoms, —$NC_4H_{10}$, —$NC_2H_6$, —$NHCH_3$, —$NH_2$, —N(alkyl chain having 3 or more carbon atoms), and one or more aromatic groups, and $R_{16}$ comprises at least one selected from the group consisting of —H, —OH, —$SO_3H$, and —COOH.

11. The display device of claim 8, wherein the green dye comprises a structure of Formula 5:

[Formula 5]

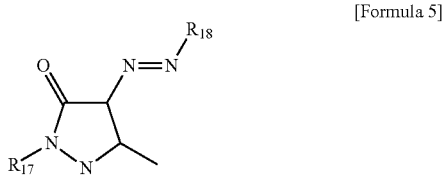

wherein $R_{17}$ and $R_{18}$ are a same or different, and $R_{17}$ and $R_{18}$ comprise at least one selected from the group consisting of structures below:

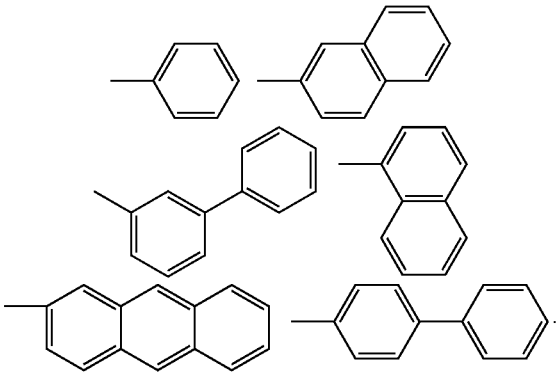

[Formula 4]

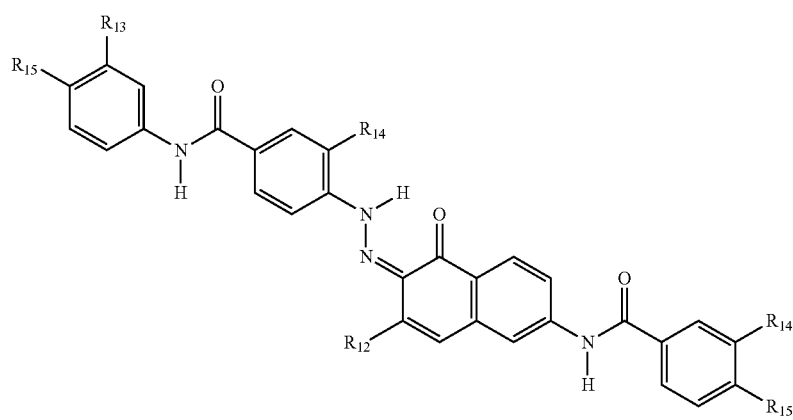

12. A method of driving the display device of claim 1, the method comprising:
    incidenting light on the display device;
    generating a color by refraction of the incident light caused by a difference between a refractive index of the polymer layer and a refractive index of the liquid crystal and scattering the incident light by the dichroic dyes in the polymer layer when there is no potential difference between the polymer layer and the liquid crystal; and
    displaying black by transmitting the incident light by allowing the liquid crystal to have a same refractive index as the refractive index of the polymer layer by aligning liquid crystal molecules of the liquid crystal in one direction when a potential difference is generated between the polymer layer and the liquid crystal.

13. The method of claim 12, further comprising:
    generating light from light-emitting devices in a dark environment, the display device including the light-emitting devices.

* * * * *